(12) United States Patent
Jonsson et al.

(10) Patent No.: US 7,094,010 B2
(45) Date of Patent: Aug. 22, 2006

(54) THREAD MILLING CUTTER, HOLDER AND A METHOD FOR MILLING AN EXTERNAL THREAD ON A SPIGOT

(75) Inventors: Christer Jonsson, Hedemora (SE); Jorma Koskinen, Fagersta (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 11/160,395

(22) Filed: Jun. 22, 2005

(65) Prior Publication Data
US 2005/0220553 A1 Oct. 6, 2005

Related U.S. Application Data

(63) Continuation of application No. PCT/SE2004/000027, filed on Jan. 13, 2004.

(30) Foreign Application Priority Data
Jan. 28, 2003 (SE) .................. 0300196

(51) Int. Cl.
*B23G 5/18* (2006.01)
(52) U.S. Cl. .................. 409/66; 407/24; 407/29; 409/74
(58) Field of Classification Search .................. 409/66, 409/65, 74, 78, 232; 408/222; 407/29, 24
See application file for complete search history.

(56) References Cited

U.S. PATENT DOCUMENTS

| | | | | |
|---|---|---|---|---|
| 270,408 A | * | 1/1883 | Forbes | 408/104 |
| 1,507,235 A | * | 9/1924 | Hall | 409/66 |
| 1,586,186 A | | 5/1926 | Erdman | |
| 2,691,921 A | * | 10/1954 | Burgsmuller et al. | 409/74 |
| 2,739,510 A | * | 3/1956 | Burgsmuller | 409/66 |
| 2,814,236 A | * | 11/1957 | Burgsmuller | 409/66 |
| 3,041,898 A | * | 7/1962 | Better | 408/238 |
| 3,107,413 A | | 10/1963 | Ohlinger | |
| 3,209,652 A | * | 10/1965 | Burgsmueller | 409/66 |
| 4,238,167 A | * | 12/1980 | Brugger et al. | 409/232 |

(Continued)

FOREIGN PATENT DOCUMENTS

DE 1119630 12/1961

(Continued)

OTHER PUBLICATIONS

International Search Report from corresponding Int'l App. PCT/SE2004/000027.

*Primary Examiner*—Daniel W. Howell
(74) *Attorney, Agent, or Firm*—White, Redway & Brown LLP

(57) ABSTRACT

The present invention relates to a thread milling cutter, which includes a cutting head, having a holder with a number of cutting insert pockets, a number of threading inserts, which are received in the cutting insert pockets and an attachment integrated with the cutting head, which attachment is intended to be received in a tool coupling. The invention also relates to the holder per se and to a method for milling an external thread on a spigot. The holder is provided with an internal cavity, which has an extension both radially and axially with regard to a rotational axis of the thread milling cutter, and the cutting insert pockets are provided in the internal cavity.

20 Claims, 3 Drawing Sheets

U.S. PATENT DOCUMENTS

| | | | |
|---|---|---|---|
| 4,784,537 A | | 11/1988 | Baker |
| 4,813,122 A | * | 3/1989 | Watanabe et al. ............. 483/57 |
| 4,831,674 A | | 5/1989 | Bergstrom et al. |
| 5,771,762 A | * | 6/1998 | Bissett ........................ 82/1.11 |
| 5,848,858 A | * | 12/1998 | Jager et al. ................... 407/34 |
| 5,873,684 A | * | 2/1999 | Flolo ........................... 409/66 |
| 6,499,917 B1 | * | 12/2002 | Parker et al. ................. 407/25 |
| 6,877,934 B1 | * | 4/2005 | Gainer ......................... 407/49 |
| 2003/0167613 A1 | * | 9/2003 | Rydberg ..................... 29/27 C |
| 2004/0134051 A1 | * | 7/2004 | Glimpel et al. ............. 29/33 K |

FOREIGN PATENT DOCUMENTS

| | | |
|---|---|---|
| DE | 29 45 611 | 10/1980 |
| DE | 19929068 | 12/2000 |
| GB | 123226 | 2/1919 |
| JP | 02232119 A * | 9/1990 |

* cited by examiner

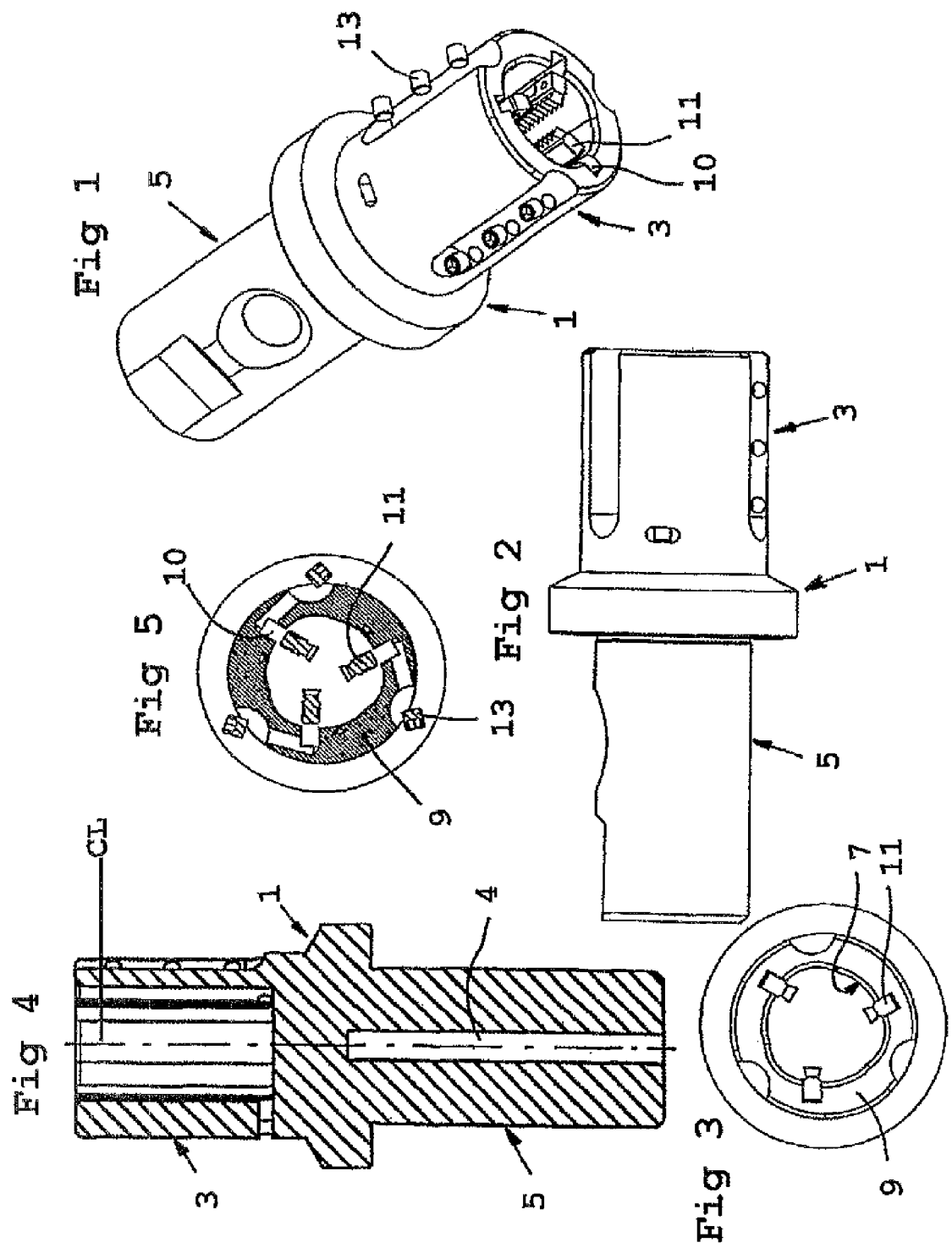

THREAD MILLING CUTTER, HOLDER AND A METHOD FOR MILLING AN EXTERNAL THREAD ON A SPIGOT

DESCRIPTION

The present application is a continuation of International Application No. PCT/SE2004/000027, filed Jan. 13, 2004, which claims priority to SE 03001 96-3, filed Jan. 28, 2003, both of which applications are incorporated by reference.

The present invention relates to a thread milling cutter, a holder and a method for milling an external thread on a spigot according to the preambles of the appended independent claims.

Through SE-C-517 447 a thread milling cutter is previously known, which has a holder that on its outside is provided with insert pockets in the shape of axially extending grooves. The number of insert pockets can vary and the localization of the insert positions is symmetrical with regard to the rotational axis of the thread-milling cutter. Threading inserts with generally parallelepipedical basic shapes are provided in the insert positions. The threading inserts are fixed in their associated insert pockets by screws that are received by threaded holes in the holder. Generally when a thread milling cutter according to SE-C-517 447 shall produce an external thread through circular interpolation the rotational center of the tool touch a circle that has a considerably greater diameter than the diameter of the spigot that shall be provided with the external thread.

It is desirable to provide a thread-milling cutter of the above-captioned defined type, which can mill an external thread on a spigot.

It is also desirable to provide a method to efficiently produce threads on a spigot.

It is also desirable to provide a thread-milling cutter that can machine two threads simultaneously.

According to an aspect of the present invention, a thread milling cutter comprises a cutting head having a holder, chip forming members provided on the holder, and an attachment integrated with the cutting head, the attachment being adapted to be received in a tool coupling. The holder includes an internal cavity that extends both radially and axially relative to a rotational axis of the thread milling cutter, and at least a portion of the chip forming members are disposed in the internal cavity.

According to another aspect of the present invention, a holder forming part of a thread milling cutter comprises a number of cutting insert pockets and an internal cavity, the internal cavity extending radially and axially relative to a rotational axis of the thread milling cutter. At least some of the cutting insert pockets are disposed in the internal cavity.

According to another aspect of the present invention, a method for milling an external thread on a spigot, the spigot having a circumference, is provided. According to the method, a tool is rotated, the tool being provided with at least one chip forming member, around a rotational axis of the tool. The rotational axis is moved along a circular path, the circular path being provided inside of the circumference of the spigot.

BRIEF DESCRIPTION OF THE DRAWINGS

Below embodiments of the invention will be described with reference to the enclosed drawings, wherein:

FIG. 1 shows a perspective view of a tool according to the present invention, i.e. the cutting inserts are not mounted to their cutting insert pockets;

FIG. 2 shows a side view of the tool according to FIG. 1;

FIG. 3 shows an end view of the tool according to FIG. 1, wherein the cutting inserts are mounted to their cutting insert pockets;

FIG. 4 shows a longitudinal cross-section through the center of the tool according to FIG. 1;

FIG. 5 shows a cross-section through a holder of the tool, lateral to the rotational axis of the tool, wherein the cutting inserts are not mounted to their cutting insert pockets;

DETAILED DESCRIPTION

Figure 6:
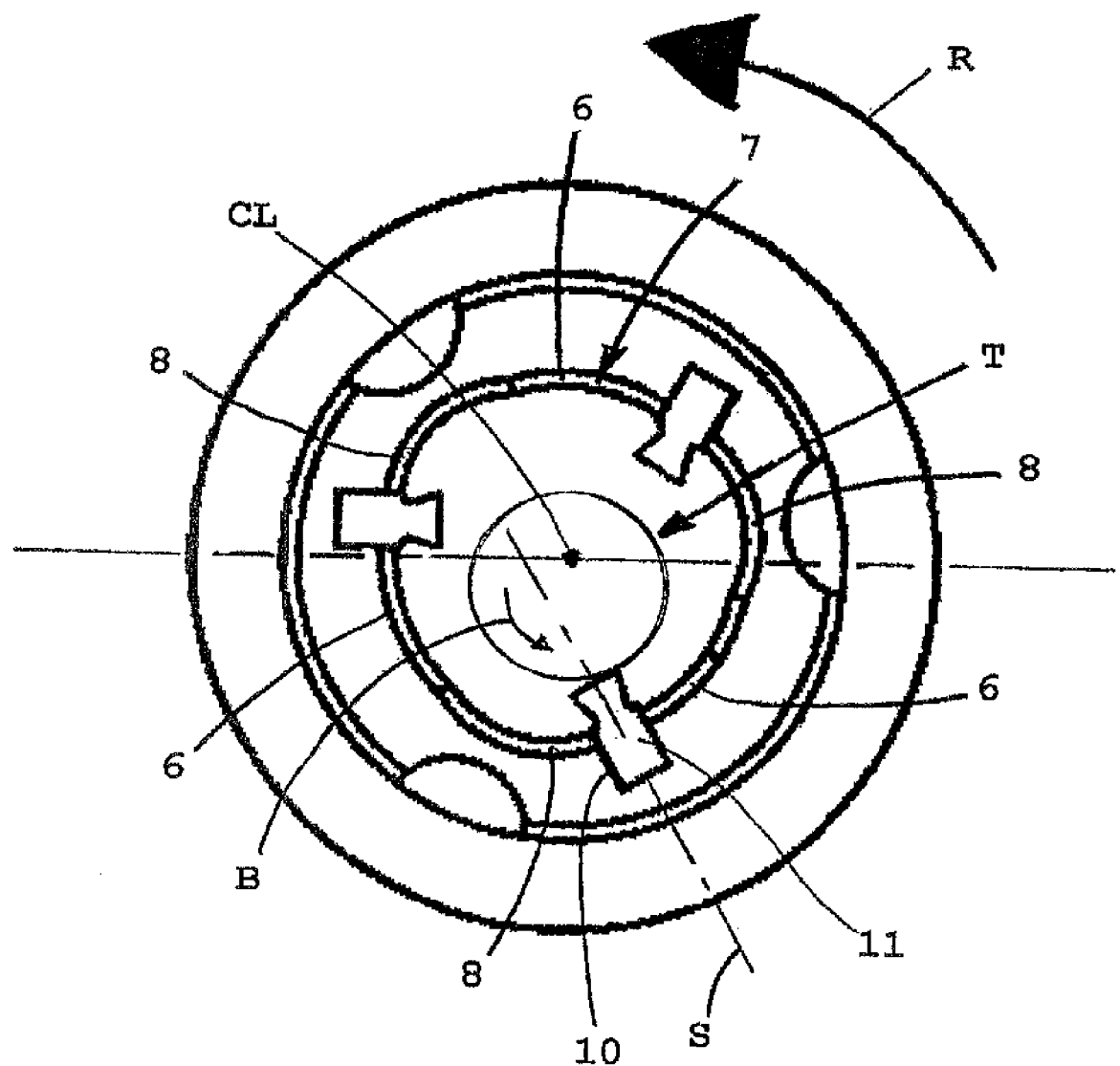
FIG. 6 shows schematically how the tool according to FIGS. 1-5 performs external machining of a spigot.

The embodiment shown in FIGS. 1–5 of a thread-milling cutter according to the present invention comprises a cutting head 1 with a holder 3. The thread-milling cutter furthermore comprises an attachment 5, which is in the shape of a shank. The attachment 5 is intended to be received in a tool coupling. An axially extending channel 4 for coolant is provided in the attachment 5.

The holder 3 generally has an external circular cylindrical shape, wherein the holder 3 has a recess/cavity 7, which has an axial extension along a rotational axis CL of the thread milling cutter. The cavity 7 is not circular cylindrical but is compounded by six segments of a circle, each constituting a part of an circular cylinder. Three of the segments of a circle have the same radius of curvature and are depicted by 6. The remaining three segments of a circle are depicted by 8. Also these segments of a circle have the same radius of curvature. Such as is most visible in FIG. 5 the segments 6 have a greater radius of curvature than segments 8. Thereby, the bordering surface of the cavity 7 obtains a generally somewhat wavy shape, wherein then segments 6,8 are mutually arranged such that an optimal chip space will be obtained. The cavity 7 defines together with the outside of the holder 3 a wall portion 9 with a certain material thickness. Such as shown in FIG. 3 a number of cutting insert pockets 10 are made in the wall portion 9, said cutting insert pockets 10 terminating on the inside of the wall portions 9. It is understood that the thickness of the wall portion 9 should be greater than the depth of the cutting insert pockets 10.

More exactly, the thickness of the material of the wall portion 9 should be so much greater than the depth of the cutting insert pockets 10 that enough material remains between the bottom of the cutting insert pockets 10 and external surface of the wall portions 9 in order to guarantee requisite stability. The threading inserts 11 are mounted in the cutting insert pockets 10. The threading inserts 11 are only schematically shown in FIG. 2. The threading inserts 11 and the means/the screws 13 for fixation of the threading inserts 11 in the cutting insert pockets 10 are principally of corresponding type as is described in SE-C-517 447. Reference is therefore done to this document when it applies to the details of the cutting insert pockets 10, the threading inserts 11 and the screws 13.

In FIG. 6 is schematically shown how the thread milling cutter according to FIGS. 1–4 machines a circular cylindrical spigot T, said spigot T being provided with an external thread. The cavity 7 surrounds the spigot T and the thread milling cutter is rotated around its rotational axis CL simultaneously as the rotational axis CL follow a circular path, which is situated inside the periphery of the shank T, The rotational direction of the thread milling cutter is depicted by the arrow R and the movement of the rotational axis CL along a circular path is indicated by the arrow B. In order to convey a suitable pitch to the thread a certain axial dislocation of the thread milling cutter occurs. When the movement of the rotational axis CL in the direction of the arrow B closes a circle the spigot T has been provided with an external thread.

The threading inserts 11 are oriented in the holder 3 such that a clearance is formed between the threading inserts 11 and the spigot T being machined by threading inserts 11. This is symbolized by a longitudinal symmetry plane S of the threading insert 11 being situated to the side the rotational axis CL of the tool. In this connection shall be noted that only one threading insert 11 at the time is in contact with the spigot T during one revolution of the thread milling cutter during machining of an external thread on the spigot. Generally, circular interpolation is used at the above-described machining. With the term "thread milling cutter" shall in this connection be understood a tool that performs machining by circular interpolation.

In this connection shall be noted that at comparison between the radius of the circle with which the rotational axis CL of the tool according to the present invention moves and the radius of the corresponding circle for a tool according to prior art the relationship is in the magnitude of 1:4. A tool according to prior art must move a distance that is four times the distance the tool according to the invention must move in order for a thread milling cutter to complete one revolution around the spigot that shall be provided with a thread. It is immediately perceived that this results in a substantial difference in time for performing corresponding machining operations.

Figure 7:
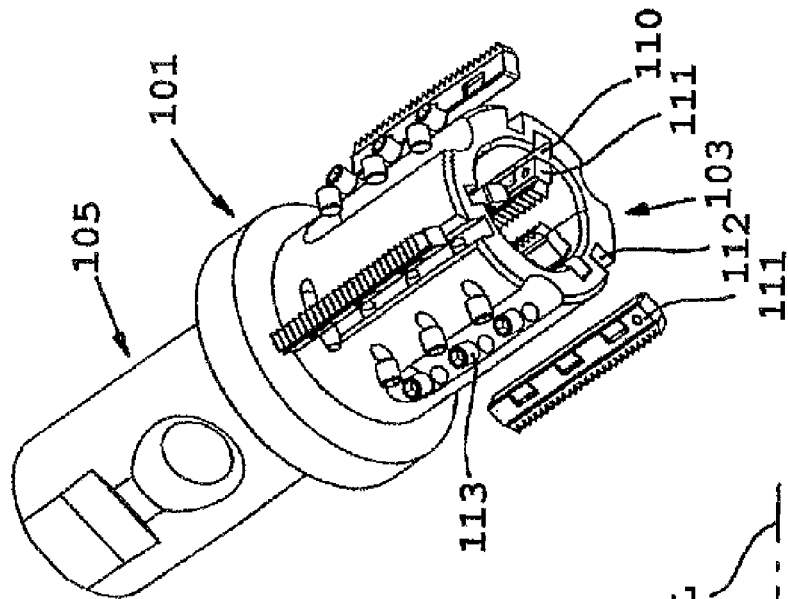
FIG. 7 shows an exploded perspective view of an alternative embodiment of a tool according to the present invention.
Figure 8:
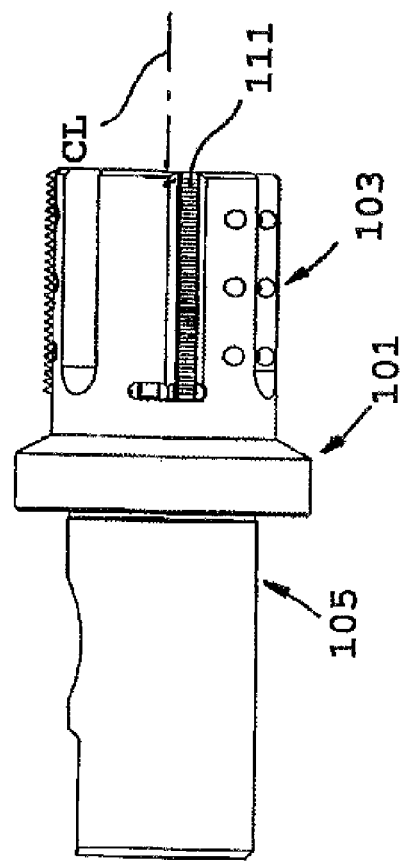
FIG. 8 shows a side view of the tool according to FIG. 7, wherein the external cutting inserts are mounted to their cutting insert pockets.
Figure 9:
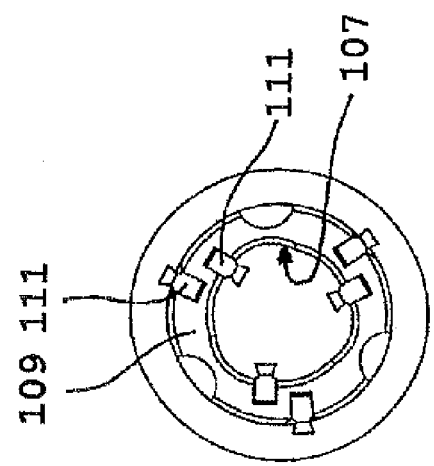
FIG. 9 shows an end view of the tool according to FIG. 7, wherein the cutting inserts are mounted to their cutting insert pockets.

At the alternative embodiment shown in FIGS. 7–9 the thread milling cutter according to the present invention is equipped with both internal and external cutting insert pockets in the wall portion 109. The internal cutting insert pockets 110 are in principle identical with the internal cutting insert pockets 10 of the thread milling cutter according to FIGS. 1–5 concerning localization in the wall portion 9. The external cutting insert pockets 112 are located in the wall portion 9 such that they do not interfere with the internal cutting insert pockets 110. In addition, the external cutting insert pockets 112 have such an orientation that threading inserts 111 placed in these external cutting insert pockets 112 have a clearance relative to the work piece to be machined with the external threading inserts 111. Generally, the cutting insert pockets and the threading inserts 111 therein have a design corresponding with the cutting insert pockets and the threading inserts of SE-C-517 447.

The thread-milling cutter according to FIGS. 7–9 may in principle perform simultaneous machining of both an external and an internal thread. In this case circular interpolation applied both at the internal and the external machining.

Concerning the threading inserts 111 that the thread milling cutter according to FIGS. 7–9 are equipped with the internal and external threading inserts can be identical, such as is the case in the above-described embodiment according to FIGS. 7–9, or be of different design.

Generally, the thread-milling cutter according to the present invention is rigid due to a relatively seen great outer diameter.

At the above-described embodiments the thread-milling cutter is equipped with interchangeable cutting inserts for chip removing machining. However, one can within the limits of the present invention also design the chip creating means as a one-piece unit with the holder, wherein this can apply to both the chip creating-means in the cavity provided and the chip creating means provided on the holder surface.

Three threading inserts 11; 111 are provided in the cavity 7; 107 in the above-described embodiments. However one can within the limits of the present invention also conceive that the number of cutting insert pockets/threading inserts in the cavity both is fewer than three and also more than three. Corresponding applies also for the external cutting insert pockets in the embodiment according to FIGS. 7–9.

In the above-described embodiments the holder 3,103 is integral with the attachment 5; 105. However one can within the limits of the present invention also conceive that the holder and the attachment constitutes separate units that are mutually connected with for example a threaded joint.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A thread milling cutter, comprising a cutting head having a holder, chip forming members provided on the holder, and a flange and a shank integrated with the cutting head, the shank being adapted to be received in a tool coupling up to the flange, wherein the holder includes an internal cavity that extends both radially and axially relative to a rotational axis of the thread milling cutter, and at least a portion of the chip forming members are disposed in the internal cavity, and wherein internal chip forming members disposed in the internal cavity are each symmetrical about a longitudinal plane of each internal chip forming member, the longitudinal plane of symmetry of each internal chip forming member extending to a side of a rotational axis of the cutter.

2. The thread milling cutter according to claim 1, wherein the chip forming members comprise a number of threading inserts which are adapted to be received in a corresponding number of cutting insert pockets, and at least a portion of the cutting insert pockets are disposed in the internal cavity.

3. The thread milling cutter according to claim 2, wherein the chip forming members extend axially along a major part of the holder.

4. The thread milling cutter according to claim 2, wherein there are three cutting insert pockets in the cavity.

5. The thread milling cutter according to claim 4, wherein a longitudinal symmetry plane of each threading insert is offset from the rotational axis.

6. A thread milling cutter, comprising a cutting head having a holder, chip forming members provided on the holder, and an attachment integrated with the cutting head, the attachment being adapted to be received in a tool coupling, wherein the holder includes an internal cavity that extends both radially and axially relative to a rotational axis of the thread milling cutter, and at least a portion of the chip forming members are disposed in the internal cavity, wherein the chip forming members comprise a number of threading inserts which are adapted to be received in a corresponding number of cutting insert pockets, and at least a portion of the cutting insert pockets are disposed in the internal cavity, wherein there are three cutting insert pockets in the cavity, a longitudinal symmetry plane of each threading insert is offset from the rotational axis, and wherein at least one cutting insert pocket is provided on an outside of the holder.

7. A thread milling cutter, comprising a cutting head having a holder, chip forming members provided on the holder, and an attachment integrated with the cutting head, the attachment being adapted to be received in a tool coupling, wherein the holder includes an internal cavity that extends both radially and axially relative to a rotational axis of the thread milling cutter, and at least a portion of the chip forming members are disposed in the internal cavity, wherein the chip forming members comprise a number of threading inserts which are adapted to be received in a corresponding number of cutting insert pockets, and at least a portion of the cutting insert pockets are disposed in the internal cavity, wherein there are three cutting insert pockets in the cavity, and wherein at least one cutting insert pocket is provided on an outside of the holder.

8. The thread milling cutter according to claim 2, wherein a longitudinal symmetry plane of each threading insert is offset from the rotational axis.

9. A thread milling cutter, comprising a cutting head having a holder, chip forming members provided on the holder, and an attachment integrated with the cutting head, the attachment being adapted to be received in a tool coupling, wherein the holder includes an internal cavity that extends both radially and axially relative to a rotational axis of the thread milling cutter, and at least a portion of the chip forming members are disposed in the internal cavity, wherein the chip forming members comprise a number of threading inserts which are adapted to be received in a corresponding number of cutting insert pockets, and at least a portion of the cutting insert pockets are disposed in the internal cavity, a longitudinal symmetry plane of each threading insert is offset from the rotational axis and wherein at least one cutting insert pocket is provided on an outside of the holder.

10. A thread milling cutter, comprising a cutting head having a holder, chip forming members provided on the holder, and an attachment integrated with the cutting head, the attachment being adapted to be received in a tool coupling, wherein the holder includes an internal cavity that extends both radially and axially relative to a rotational axis of the thread milling cutter, and at least a portion of the chip forming members are disposed in the internal cavity, wherein the chip forming members comprise a number of threading inserts which are adapted to be received in a corresponding number of cutting insert pockets, and at least a portion of the cutting insert pockets are disposed in the internal cavity, wherein at least one cutting insert pocket is provided on an outside of the holder.

11. The thread milling cutter according to claim 3, wherein a longitudinal symmetry plane of each threading insert is offset from the rotational axis.

12. A thread milling cutter, comprising a cutting head having a holder, chip forming members provided on the holder, and an attachment integrated with the cutting head, the attachment being adapted to be received in a tool coupling, wherein the holder includes an internal cavity that extends both radially and axially relative to a rotational axis of the thread milling cutter, and at least a portion of the chip forming members are disposed in the internal cavity, wherein the chip forming members comprise a number of threading inserts which are adapted to be received in a corresponding number of cutting insert pockets, and at least a portion of the cutting insert pockets are disposed in the internal cavity, the chip forming members extend axially along a major part of the holder, and a longitudinal symmetry plane of each threading insert is offset from the rotational axis, wherein at least one cutting insert pocket is provided on an outside of the holder.

13. The thread milling cutter according to claim 1, wherein the chip forming members extend axially along a major part of the holder.

14. A holder forming part of a thread milling cutter, a portion of the thread milling cutter being securable up to a predetermined depth inside of a tool coupling for securing the thread milling cutter to the tool coupling, the holder being provided with a number of cutting insert pockets and an internal cavity, the internal cavity extending radially and axially relative to a rotational axis of the thread milling cutter, and at least some of the cutting insert pockets are disposed in the internal cavity and are adapted to retain internal cutting inserts, each of the cutting inserts being symmetrical about a longitudinal plane, so that the longitudinal plane of symmetry of each internal cutting insert extends to a side of a rotational axis of the cutter.

15. The holder according to claim 14, wherein the cutting insert pockets extend axially along a major part of the holder.

16. The holder according to claim 15, wherein there are three cutting insert pockets in the cavity.

17. The holder according to claim 14, wherein there are three cutting insert pockets in the cavity.

18. A method for milling an external thread on a spigot, the spigot having a circumference, comprising rotating a tool, the tool being provided with at least one chip forming member, around a rotational axis of the tool, and moving the rotational axis along a circular path, the circular path being provided inside of the circumference of the spigot.

19. The thread milling cutter according to claim 1, wherein the internal cavity comprises a plurality of surface segments, at least two of the surface segments having different radii of curvature.

20. The holder according to claim 14, wherein the internal cavity comprises a plurality of surface segments, at least two of the surface segments having different radii of curvature.

* * * * *